US008874840B2

(12) United States Patent
Benhase et al.

(10) Patent No.: US 8,874,840 B2
(45) Date of Patent: Oct. 28, 2014

(54) ADAPTIVE PRESTAGING IN A STORAGE CONTROLLER

(71) Applicant: International Business Machines Corporation, Armonk, NY (US)

(72) Inventors: Michael T. Benhase, Tucson, AZ (US);
Nedlaya Y Francisco, Tucson, AZ (US);
Binny S. Gill, Shrewsbury, MA (US);
Lokesh M. Gupta, Tucson, AZ (US);
Suguang Li, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/786,981

(22) Filed: Mar. 6, 2013

(65) Prior Publication Data
US 2013/0246691 A1      Sep. 19, 2013

Related U.S. Application Data

(63) Continuation of application No. 13/018,305, filed on Jan. 31, 2011.

(51) Int. Cl.
*G06F 13/00* (2006.01)
*G06F 12/08* (2006.01)
*G06F 12/02* (2006.01)

(52) U.S. Cl.
CPC ........ *G06F 12/0246* (2013.01); *G06F 12/0862* (2013.01); *G06F 12/0866* (2013.01); *G06F 12/0868* (2013.01)
USPC ............................ 711/113; 711/137; 711/204

(58) Field of Classification Search
CPC ......................... G06F 12/0215; G06F 12/0862
USPC .................................. 711/113, 137, 204, 213
See application file for complete search history.

(56) References Cited

U.S. PATENT DOCUMENTS

| 5,426,761 | A | * | 6/1995 | Cord et al. ................... 711/114 |
| 5,694,581 | A | * | 12/1997 | Cheng ............................... 710/7 |
| 5,764,430 | A | * | 6/1998 | Ottesen et al. ............. 360/73.03 |
| 5,898,891 | A | * | 4/1999 | Meyer .............................. 710/33 |
| 6,260,115 | B1 | | 7/2001 | Permut et al. |
| 6,345,338 | B1 | | 2/2002 | Milillo et al. |

(Continued)

OTHER PUBLICATIONS

Office Action dated Sep. 12, 2013, pp. 17, for U.S. Appl. No. 13/018,305, filed Jan. 31, 2011.

(Continued)

*Primary Examiner* — Reba I Elmore
(74) *Attorney, Agent, or Firm* — William K. Konrad; Konrad Raynes Davda & Victor LLP

(57) ABSTRACT

In one aspect of the present description, at least one of the value of a prestage trigger and the value of the prestage amount, may be modified as a function of the drive speed of the storage drive from which the units of read data are prestaged into a cache memory. Thus, cache prestaging operations in accordance with another aspect of the present description may take into account storage devices of varying speeds and bandwidths for purposes of modifying a prestage trigger and the prestage amount. Other features and aspects may be realized, depending upon the particular application.

6 Claims, 5 Drawing Sheets

(56) References Cited

U.S. PATENT DOCUMENTS

| | | | |
|---|---|---|---|
| 6,381,677 | B1 | 4/2002 | Beardsley et al. |
| 6,449,697 | B1* | 9/2002 | Beardsley et al. ............ 711/137 |
| 6,993,629 | B2 | 1/2006 | Beardsley et al. |
| 7,079,341 | B2* | 7/2006 | Kistler et al. .................. 360/46 |
| 7,080,212 | B1 | 7/2006 | Hsu et al. |
| 7,120,736 | B2* | 10/2006 | Matsushige et al. .......... 711/112 |
| 7,822,920 | B2* | 10/2010 | Park et al. ..................... 711/113 |
| 2005/0240724 | A1 | 10/2005 | Koizumi et al. |
| 2009/0198738 | A1 | 8/2009 | Berger et al. |
| 2009/0248964 | A1 | 10/2009 | Yano et al. |
| 2010/0138620 | A1 | 6/2010 | Jess |
| 2010/0195243 | A1* | 8/2010 | Zhu et al. ................... 360/73.03 |
| 2012/0198148 | A1 | 8/2012 | Benhase et al. |

OTHER PUBLICATIONS

Response dated Dec. 12, 2013, pp. 11, to Office Action dated Dec. 12, 2013, pp. 17, for U.S. Appl. No. 13/018,305, filed Jan. 31, 2011.

B.S. Gill, et al., "AMP: Adaptive Multi-stream Prefetching in a Shared Cache", USENIX Association, FAST '07: 5th USENIX Conference on File and Storage Technologies, pp. 185-198.

Office Action dated Feb. 10, 2014, pp. 24, for U.S. Appl. No. 13/018,305, filed Jan. 31, 2011.

Response dated Apr. 10, 2014, pp. 12, to Office Action dated Feb. 10, 2014, pp. 24, for U.S. Appl. No. 13/018,305, filed Jan. 31, 2011.

RCE Amendment dated Jun. 10, 2014, to Final Office Action dated Feb. 10, 2014, pp. 24, for U.S. Appl. No. 13/018,305 filed Jan. 31, 2011 (18.367).

Office Action dated Jul. 31, 2014, pp. 11, for U.S. Appl. No. 13/018,305 filed Jan. 31, 2011 (18.367).

\* cited by examiner

ADAPTIVE PRESTAGING IN A STORAGE CONTROLLER

RELATED APPLICATION

The present application is a continuation application of copending application Ser. No. 13/018,305, filed Jan. 31, 2011, entitled "ADAPTIVE PRESTAGING IN A STORAGE CONTROLLER," assigned to the assignee of the present application, and incorporated by reference in its entirety.

BACKGROUND

1. Field

The present description relates to a method, system, and program product for prestaging data into cache from a storage system in preparation for data transfer operations.

2. Description of Related Art

In current storage systems, a storage controller manages data transfer operations between a direct access storage device (DASD), which may be a string of hard disk drives or other non-volatile storage devices and host systems and their application programs. To execute a read operation presented from a host system, i.e., a data access request (DAR), the storage controller physically accesses the data stored in tracks in the DASD. A DAR is a set of contiguous data sets, such as tracks, records, fixed blocks, or any other grouping of data. The process of physically rotating the disk in the DASD to the requested track then physically moving the reading unit to the disk section to read data is often a time consuming process. For this reason, current systems frequently stage data into a cache memory of the storage controller in advance of the host requests for such data.

In addition, storage systems may also include solid state storage devices such as flash memory. However, flash memory tends to be substantially more expensive than DASD storage.

A storage controller typically includes a large buffer managed as a cache to buffer data accessed from the attached storage. In this way, data access requests (DARs) can be serviced at electronic speeds directly from the cache thereby avoiding the delays caused by reading from storage such as DASD storage. Prior to receiving the actual DAR, the storage controller receives information on a sequence of tracks in the DASD involved in the upcoming read operation or that data is being accessed sequentially. The storage controller will then proceed to stage the sequential tracks into the cache. The storage controller would then process DARs by accessing the staged data in the cache. In this manner, the storage controller can return cached data to a read request at the data transfer speed in the storage controller channels as opposed to non-cached data which is transferred at the speed of the DASD device or other storage from which the data was transferred to the cache.

During a sequential read operation, an application program, such as a batch program, will process numerous data records stored at contiguous locations in the storage device. It is desirable during such sequential read operations to prestage the sequential data into cache in anticipation of the requests from the application program. As a result of prestaging, often one of the tracks being staged is already in cache. Present techniques used to prestage sequential blocks of data include sequential caching algorithms systems, such as those described in the commonly assigned patent entitled "CACHE DASD Sequential Staging and Method," having U.S. Pat. No. 5,426,761. A sequential caching algorithm detects when a device is requesting data as part of a sequential access operation. Upon making such a detection, the storage controller will begin prestaging sequential data records following the last requested data record into cache in anticipation of future sequential accesses.

U.S. Pat. No. 5,426,761 discloses an algorithm for sequential read operations to prestage multiple tracks into cache when the tracks are in the extent range of the sequential read operation, the track is not already in the cache, and a maximum number of tracks have not been prestaged into cache. The cached records may then be returned to the application performing the sequential data operations at speeds substantially faster than retrieving the records from a non-volatile storage device.

Another prestaging technique includes specifying a block of contiguous data records to prestage into cache in anticipation of a sequential data request. For instance, the Small Computer System Interface (SCSI) provides a prestage or prefetch command, PRE-FETCH, that specifies a logical block address where the prestaging operation begins and a transfer length of contiguous logical blocks of data to transfer to cache. The SCSI PRE-FETCH command is described in the publication "Information Technology-Small Computer System Interface-2," published by ANSI on Apr. 19, 1996, reference no. X3.131-199x, Revision 10L, which publication is incorporated herein by reference in its entirety.

Yet another prestaging technique is referred to as AMP (Adaptive Multi-stream Prefetching) in a shared cache. This technique seeks to provide an algorithm which can adapt both the amount of data being prefetched in a prefetch operation, and the value of a trigger for triggering the prefetch operation, on a per stream basis in response to evolving workloads.

As set forth above, when a host reads tracks sequentially, it benefits greatly to pre-stage tracks so that the tracks are already in cache before the host requests access to those tracks. However, a storage controller has a limited Cache and limited bandwidth. If pre-stage stages too few tracks then the host will get more cache misses since fewer tracks will be in cache. Conversely, if the host pre-stages too many tracks then it can starve other kinds of I/O in the storage controller.

Tracks staged into cache may be demoted (dropped from cache) according to a Least Recently Used (LRU) algorithm to insure that the staged data in cache does not exceed a predetermined threshold. The LRU algorithm discards the "least recently used" items first, which are generally the items which have been in the cache the longest without being used.

The data when first placed into cache may be designated ("time stamped") MRU ("most recently used") data. As the data remains unused in cache, the timestamp for that data is updated. The longer the data stays in cache unused, the closer the data moves toward an LRU timestamp. The LRU algorithm assumes that the oldest unused data is the data least likely to be used and therefore may be discarded from the cache to make room in the cache for additional data which is more likely to be accessed. In some LRU algorithms, LRU data may be redesignated with an MRU timestamp to give that data another chance to be used before being demoted, that is, discarded from cache, should the timestamp for that data again arrive at LRU status.

SUMMARY

In one aspect of the present description, at least one of the value of a prestage trigger and the value of a prestage amount may be modified as a function of the drive speed of the storage drive from which the units of read data are prestaged into a cache memory. In one embodiment, the operations include reading units of data of a sequential stream of read data stored in at least one of a first storage drive having a drive speed and a second storage drive having a drive speed. A prestage trigger is initialized to initiate prestaging of units of read data. In response to reaching the trigger as the units of the sequential stream of read data are read, units of data of the sequential stream of read data are prestaged from a storage drive into a cache memory in anticipation of a read request. In addition, at least one of the value of the prestage trigger and the value of the prestage amount may be modified as a function of the drive speed of the storage drive from which the units of read data are prestaged into the cache memory. In some embodiments, the drive speed of the first storage drive may be faster than that of the second storage drive. However, it is appreciated that in other embodiments, the drive speeds of various storage drives of the system may be the same, depending upon the particular application.

In another aspect, upon demoting a unit of data from the cache before the unit being demoted is read from cache in response to a read request, at least one of the value of the prestage trigger and the value of the prestage amount may be reduced as a function of the drive speed in association with the demoting of a unit of data from the cache.

In yet another aspect, the prestaging operations may further include comparing the modified value of the prestage trigger to the amount of data to be prestaged in response to the trigger; and prestaging additional units of data of the sequential stream of read data into the cache memory as a function of the comparison.

In still another aspect, the prestaging operations may further include staging units of data of the sequential stream of read data into the cache memory, and determining if a cache miss occurs because a staging has not completed. In one embodiment, the value of the prestage trigger may be modified by increasing the value of the prestage trigger as a function of the drive speed of the storage drive from which the units of read data are prestaged into the cache memory.

In yet another embodiment, the value of the prestage trigger may be modified by increasing the value of the prestage trigger by a first value if the read data being prestaged is from a hard disk drive, and may be modified by increasing the value of the prestage trigger by a second value higher than the first value, if the read data being prestaged is from a solid state drive.

In still another aspect, the prestaging operations may further include determining if a cache hit occurs in connection with a unit of read data which was a candidate for demotion from the cache, wherein the value of the prestage amount may be modified by decreasing the value of the prestage amount as a function of the drive speed of the storage drive from which the units of read data are prestaged into the cache memory, in response to a determination that a cache hit occurs in connection with a unit of read data which was a candidate for demotion from the cache. In one embodiment, the value of the prestage amount may be decreased by decreasing the value of the prestage trigger by a first value if the read data being prestaged is from a hard disk drive and by decreasing the value of the prestage trigger by a second value higher than the first value, if the read data being prestaged is from a solid state storage drive.

Other features and aspects may be realized, depending upon the particular application.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
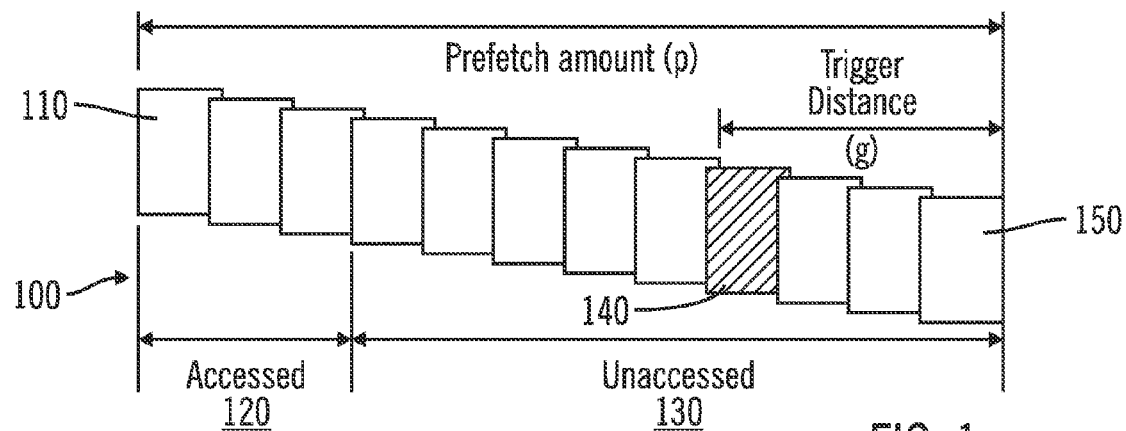
FIG. 1 illustrates a trigger distance in a stream of data for triggering the prestaging of data into a cache.

FIG. 1 shows a set 100 of a stream of sequential read data which has been prefetched or prestaged into a cache. The set 100 may be a set of sequential pages, tracks or other units 110 of sequential read data. In this example, read data is prestaged in a prestageAmount (p) of tracks. A first portion 120 of the set 100 is indicated as being accessed by a storage controller or host in connection with a read operation. The remaining portion 130 of the set 100 is indicated as being unaccessed, that is, having not yet been accessed.

A trigger track 140 is identified at a trigger distance (g) from the end 150 of the unaccessed tracks 130 of the prestaged set 100. Once the tracks being accessed reaches the trigger track 140, another set 100 of the next p sequential tracks of the stream of sequential read data is prefetched or prestaged into the cache. Once the tracks being accessed reaches the trigger track 140 of that next set 100, yet another set 100 of the next p sequential tracks of the stream of sequential read data is prefetched or prestaged into the cache, and so on.

A prior art algorithm called AMP (Adaptive Multi-stream Prefetching) can adapt both the amount (p) of data being prestaged in a prestage operation, and the value of the trigger (g) for triggering the prestage operation, on a per stream basis in response to changing workloads. The AMP algorithm is based upon the theorem that improved performance may be obtained where, for each individual stream of sequential read data, the prestageAmount (p) should be: $p=r*L$, where r is the request rate of the stream (measured in tracks/second) and L is the life of the shared cache (MRU (Most Recently Used) timestamp minus LRU (Least Recently Used) timestamp). Accordingly, it is believed that when the prestageAmount $p > r*L$, that data in cache will likely be demoted before being used.

Also, for each individual stream the prestageTrigger $g+1=r*t(p)$, $0 \leq g < p$ where t(p) is the average time to fetch p consecutive tracks. It is believed that when the prestageTrigger $g < r*t(p)$, a cache miss is likely to happen.

Figure 2:
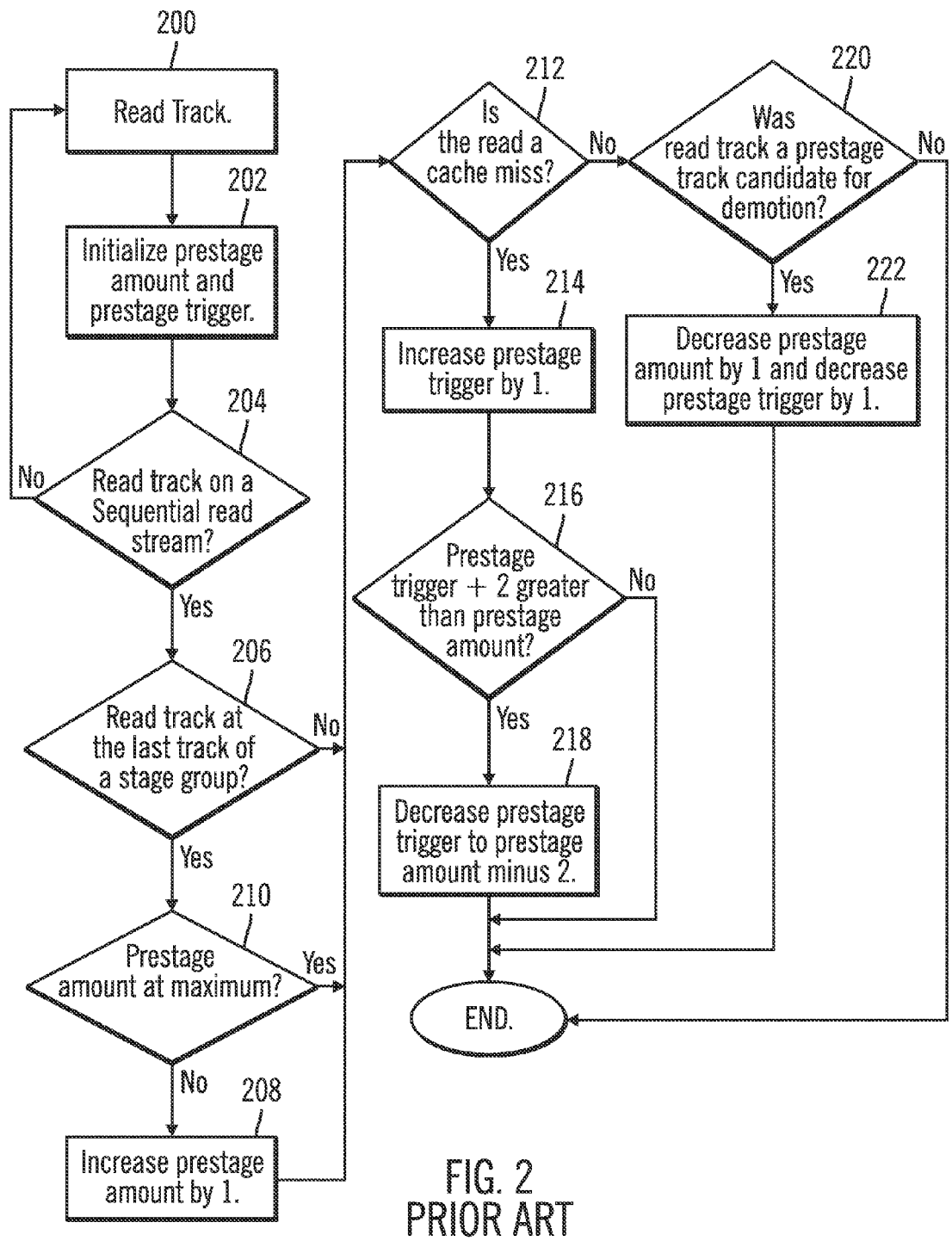
FIG. 2 shows an example of cache operations in accordance with a prior art Adaptive Multi-stream Prefetching (AMP) algorithm.

FIG. 2 shows an example of cache operations in accordance with a prior art AMP algorithm, for determining both the number p of tracks to prestage and the value of the trigger g which triggers a prestage operation. Upon reading a track (block 200), the prestage amount (p) and the value of the prestage trigger (g) are initialized (block 202). In one prior art AMP algorithm, the prestage amount p may be initialized at 8 tracks and the value of the prestage trigger g may be initialized at distance of 3 tracks, for example.

If it is determined (block 204) that the track being read is on a sequential read stream and it is determined (block 206) that the track being read is at the last track of a stage group, the prestage amount p is increased (block 208) by 1. By increasing the prestage amount p, it is intended to decrease the chances of running out of prestaged data and causing a cache miss. However, if it is previously determined (block 210) that the prestage amount p has reached a maximum, such as a maximum of 84, for example, the prestage amount p is not increased.

If it is determined (block 206) that the track being read is not at the last track of a stage group, and it is determined (block 212) that the track being read is a cache miss, the prestage trigger distance g is increased (block 214) by 1. By increasing the prestage trigger distance g, it is intended to trigger the prestaging of additional data sooner to reduce the chances of future cache misses. However, if it determined (block 216) that the prestage trigger g plus 2 (g+2) has exceeded the prestage amount p, the prestage trigger is reduced (block 218) to the prestage amount p minus 2 (p−2).

If it is determined (block 212) that the track that was read was not a cache miss (that is, it was a cache hit), a determination is made (block 220) as to whether that track was prestaged in cache and whether it was a "candidate" for demotion from cache.

Figure 6:
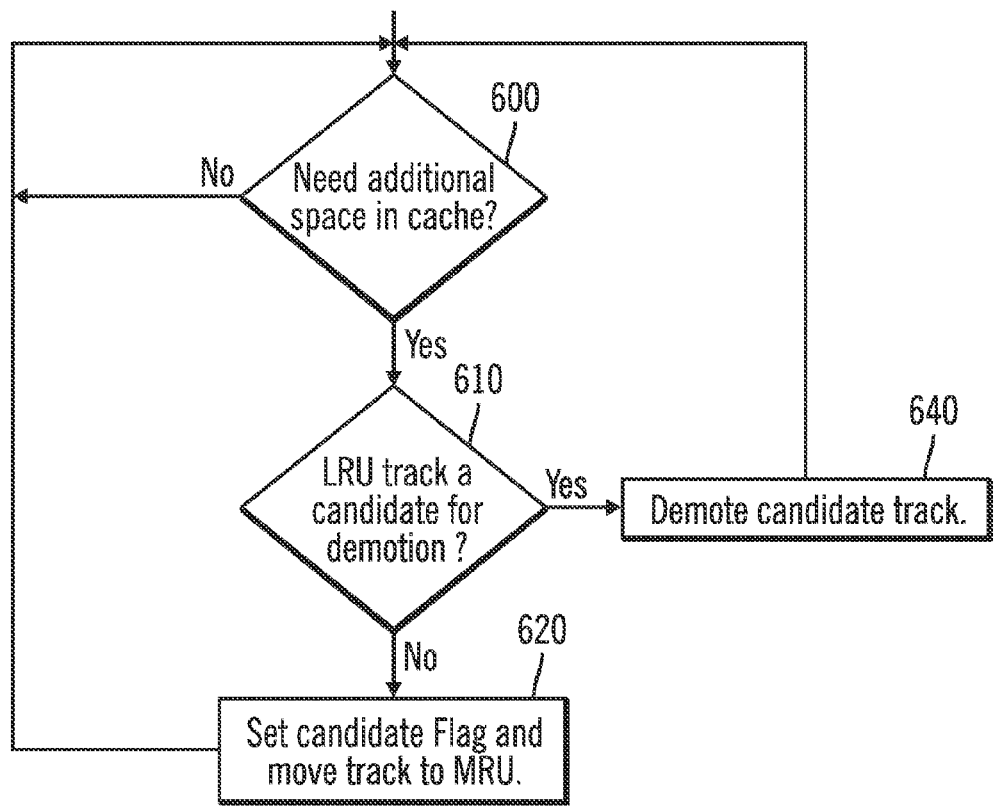
FIG. 6 illustrates an example of prior art cache operations in which tracks may become candidates for demotion.

FIG. 6 illustrates an example of cache operations in which tracks may become candidates for demotion. A determination is made (block 600) as to whether additional space is needed in cache. If so, a determination is made (block 610) as to whether the LRU track is a candidate for demotion. If not, in this algorithm, LRU data is redesignated with an MRU timestamp (block 620) to give that data another chance to be used before being demoted, that is, discarded from cache, should the timestamp for that data again arrive at LRU status. LRU data redesignated with an MRU timestamp is referred to herein as a "candidate" for demotion. A flag is also set (block 620) to mark the LRU data redesignated with an MRU timestamp as a "candidate" for demotion. Once candidate data again arrives (block 610) at LRU status because the track has remained unused in cache for too long, the candidate data is demoted (block 640) from cache.

Referring back to FIG. 2, if it is determined (block 220) that the track being read was prestaged in cache and was a "candidate" for demotion from cache, both the prestage amount (p) and the prestage trigger g are each decreased (block 222) by 1. By decreasing the prestage amount p and the trigger g, it is intended to reduce the amount of data being prestaged each time and to delay the prestaging of additional data into cache, to reduce the number of candidates for demotion and to reduce demotion of data from cache.

Hardware and Software Environment

Figure 3:
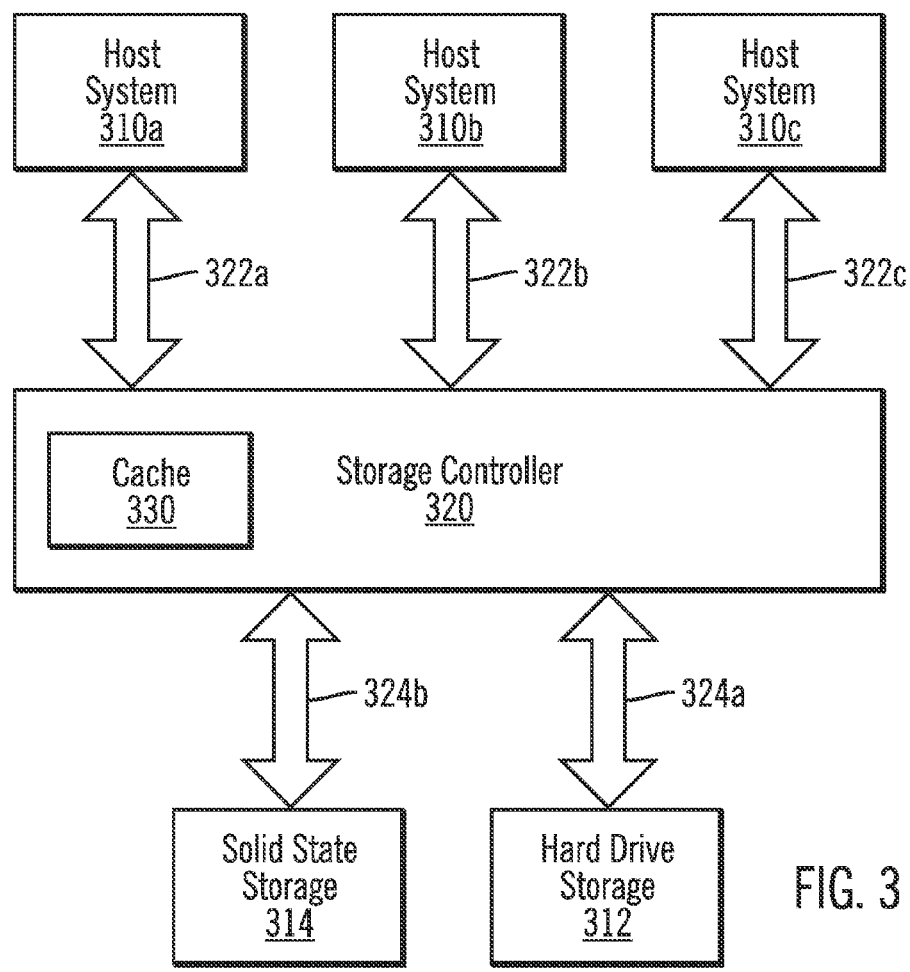
FIG. 3 illustrates an embodiment of a computing environment in which an aspect of the present description may be employed.

FIG. 3 illustrates an example of a hardware environment in which embodiments may be implemented. A plurality of host systems 310a, 310b, 310c are in data communication with a plurality of storage units such as a hard disk drive 312 such as a DASD, and a solid state storage 314 such as a Flash memory, via a storage controller 320.

The storage controller further includes a cache 330 in which data is prestaged and staged. In accordance with one aspect of the present description, and as explained in greater detail below, the storage controller 320 can prestage data in such a manner that one or both of the prestage amount and the prestage trigger may be modified as a function of the speeds and bandwidths of the various storage devices coupled to the storage controller 320. Thus, in this embodiment, the solid state storage 314 has a substantially faster access time as compared to that of the hard drive storage 312. Consequently, when cache conditions indicate that it is appropriate to modify the prestage amount or prestage trigger, the prestage amount or prestage trigger for a stream of data being read from the faster flash memory storage 314 may be modified a lower amount, for example, as compared to a modification of the prestage amount or prestage trigger for a stream of data being read from slower hard drive storage 312. Other features and advantages will also be explained in connection with the present description.

The host systems 310a, 310b, 310c may be any host system known in the art, such as a mainframe computer, workstations, etc., including an operating system such as WINDOWS®, AIX®, UNIX®, MVS™, etc. AIX is a registered trademark of IBM; MVS is a trademark of IBM; WINDOWS is a registered trademark of Microsoft Corporation; and UNIX is a registered trademark licensed by the X/Open Company LTD. A plurality of channel paths 322a, 322b, 322c in the host systems 310a, 310b, 310c provide communication paths to the storage controller 320. The storage controller 320 and host systems 310a, 310b, 310c may communicate via any network or communication system known in the art, such as LAN, TCP/IP, ESCON®, SAN, SNA, Fibre Channel, SCSI, etc. ESCON is a registered trademark of International Business Machines Corporation ("IBM"). The host system 310a, 310b, 310c executes commands and receives returned data along a selected channel 322a, 322b, 322c. The storage controller 320 issues commands via a path 324a to physically position the electromechanical devices to read the storage 312. The storage controller 320 also issues commands via a path 324b to read data from the solid state storage 314.

In preferred embodiments, the cache 330 is implemented in a high speed, volatile storage area within the storage controller 320, such as a DRAM, RAM, etc. The length of time since the last use of a record in cache 330 is maintained to determine the frequency of use of cache 330. The least recently used (LRU) data in cache 330 may be demoted according to LRU or other cache memory management techniques known in the art. In alternative embodiments, the cache 330 may be implemented in alternative storage areas accessible to the storage controller 320. Data can be transferred between the channels 322a, 322b, 322c and the cache 330, between the channels 322a, 322b, 322c and the storage 312, 314 and between the storage 312, 314 and the cache 330. In alternative embodiments with branching, data retrieved from the storage 312, 314 in response to a read miss can be concurrently transferred to both the channel 322a, 322b, 322c and the cache 330 and a data write can be concurrently transferred from the channel 322a, 322b, 322c to both a non-volatile storage unit and cache 330. It is appreciated that the number of hosts, storage controllers, caches and storage drives may vary, depending upon the particular application.

Figure 4:
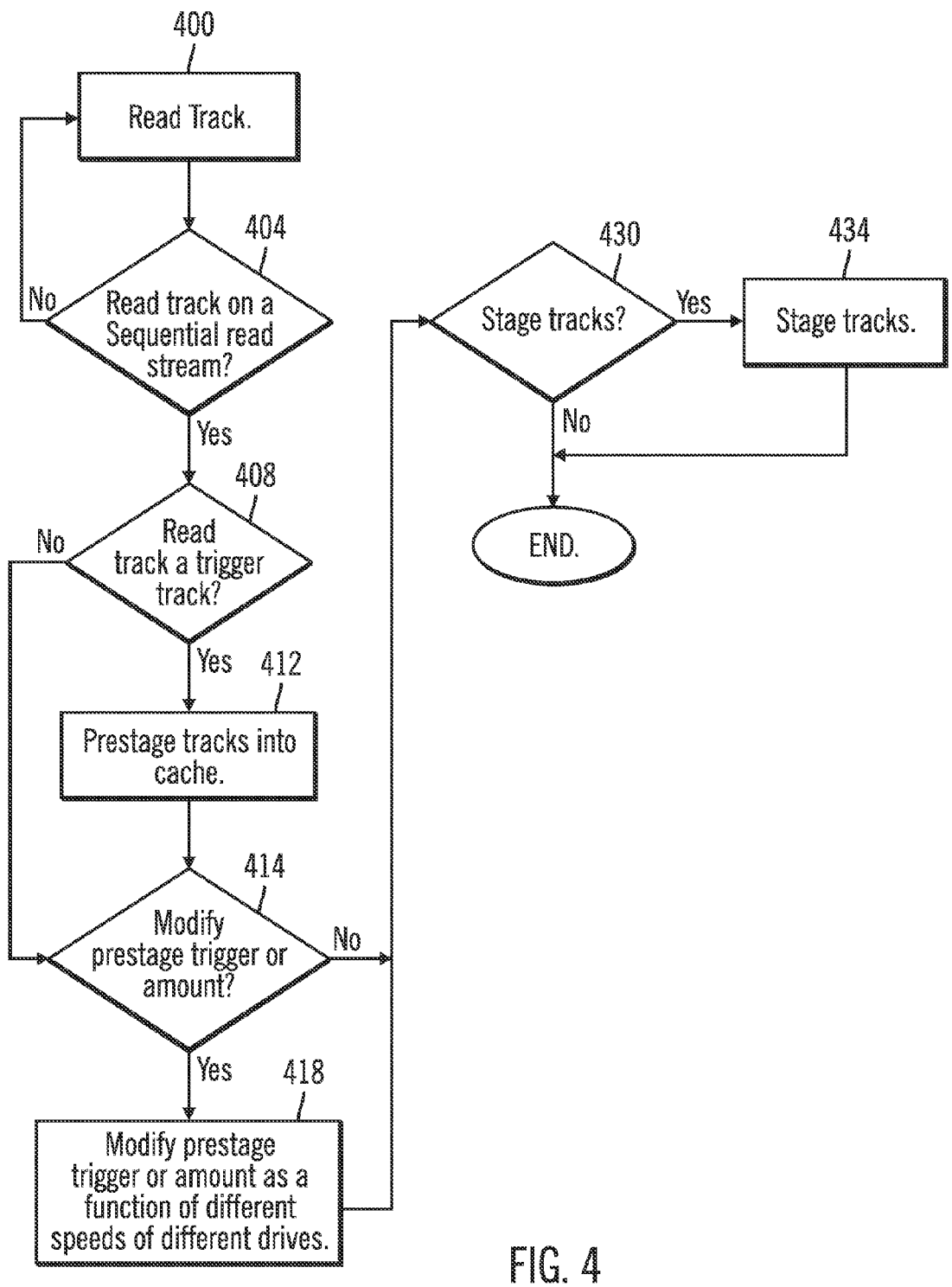
FIG. 4 shows an example of operations of a cache in connection with prestaging tracks into the cache in accordance with one embodiment of the present description.

FIG. 4 shows one embodiment of operations of the cache 330 in connection with prestaging tracks into the cache 330. In a first operation, a track is read (block 400). A determination is made as to whether (block 404) the track being read is on a sequential read stream. If so, a determination is made as to whether (block 408) the track being read is a trigger track. If the track being read is a trigger track, the next group of tracks is prestaged (block 412) into cache.

Figure 5:
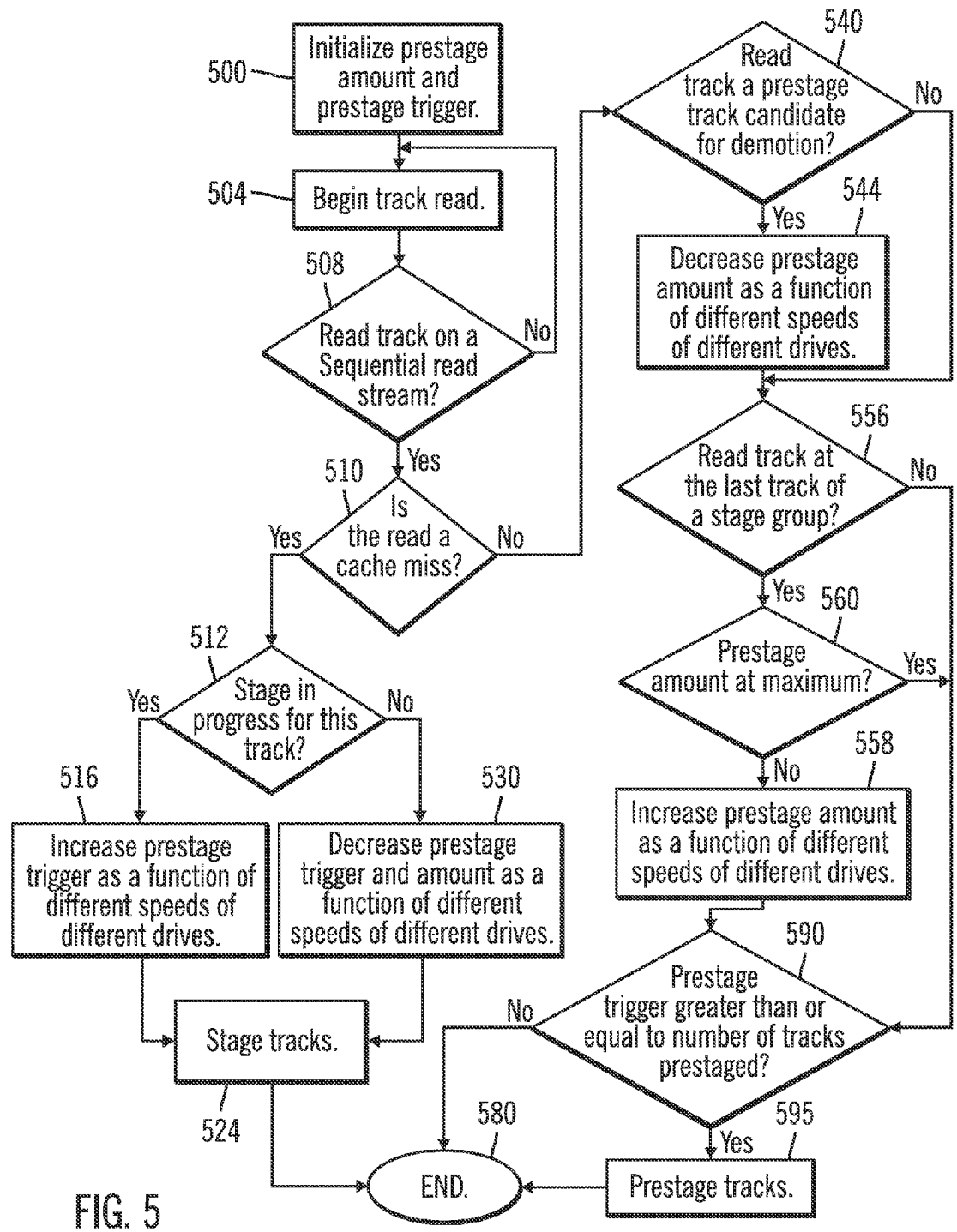
FIG. 5 shows a more detailed example of operations for prestage trigger and amount modification and other features in accordance with one embodiment of the present description.

A determination is also made as to whether the conditions in the cache are such that the prestage trigger or prestage amount should be modified (block 414). If so, the prestage trigger may be modified (block 418) as a function of the different speeds of the different drives coupled to the storage controller. FIG. 5 discussed below shows an example of such a determination and an example of such a prestage trigger or amount modification as a function of different drives speeds.

In another operation, a determination is made as to whether to stage tracks (block 430). If so, additional tracks are staged (block 434). FIG. 5 discussed below shows an example of such a determination.

FIG. 5 shows a more detailed example of certain operations for prestage trigger and amount modification and other features. In this example, modifications to the prestage trigger are based upon a theorem that:

$$r*t(N)<=g+1<=r*L$$

where g is the prestage trigger, r is the request rate of the stream (tracks/sec), L is the life of the shared cache (MRU timestamp—LRU timestamp), t(N) is the average time to fetch N consecutive tracks, and N is the stride size of the device (4*rank width).

In one operation, the prestage amount (p) and the value of the prestage trigger (g) are initialized (block 500). In this example, the prestage amount p may be initialized at 8 tracks and the value of the prestage trigger g may be initialized at distance of 3 tracks, for example. Thus, it will be seen that when a track is read, the prestage trigger of this track is the larger one of 3 or the prestage trigger of the previous track. It is appreciated that other values may be selected for initialization of the prestage amount p and the prestage trigger g, depending upon the particular application A track is read (block 504) and a determination is made as to whether (block 508) the track being read is on a sequential read stream. If so, another determination is made as to whether (block 510) the track being read was in connection with a cache miss. If so, a determination is made as to whether (block 512) a stage issued in connection with the track being read. If so, the prestage trigger is increased (block 516) as a function of different speeds of different drives and tracks are staged (block 524).

If a stage had issued in connection with the read which resulted in a cache miss, the cache miss may have occurred as a result of waiting for that issued stage to complete. In this example, the prestage trigger of this track may be increased based on the speed of the drives. For example, if the track was read from the hard drive storage 312, the prestage trigger may be increased by 1, for example. If the track was read from a faster drive such as the solid state storage 314, the prestage trigger may be increased by a greater amount such as by 2, for example. Such differentiated increments may facilitate aiding the completion of the issued stages before a cache miss occurs. It is appreciated that other values may be selected for incrementing the prestage trigger g as a function of different drive speeds, depending upon the particular application.

Alternatively, if a stage had not issued (block 512) in connection with the read which resulted in a cache miss, the cache miss may have occurred as a result of that track having been demoted before being used. As a result, it may be appropriate to delay prestaging additional tracks or to reduce (block 530) the amount being prestaged.

In this example, both the prestage trigger and the prestage amount may be decreased (block 530) as a function of the different speeds of the different drives. For example, if the track was read from the hard drive storage 312, the prestage trigger may be decreased by 1, for example, and the prestage amount may be reduced by 1, for example. If the track was read from a faster drive such as solid state storage 314, the prestage trigger may be decreased by a greater amount such as by 2, for example, and the prestage amount may be reduced by 2, for example. Such differentiated decrements may facilitate reducing the number of candidate tracks for demotion. It is appreciated that other values may be selected for decrementing the prestage trigger g and the prestage amount p as a function of different drive speeds, depending upon the particular application. In addition, tracks are staged (block 524).

If it is determined (block 510) the track being read was a cache hit rather than a cache miss, another determination is made as to whether (block 540) the track being read is a prestage track candidate for demotion. If so, it may be appropriate to reduce the amount of data being prestaged to reduce the number of candidates for demotion. In this embodiment, the prestage amount is decreased (block 544) as a function of different speeds of different drives.

For example, if the track was read from the hard drive storage 312 which is slower than the solid state drive 314, the prestage amount may be decreased by 1, for example. If the track was read from a faster drive such as solid state storage 314, the prestage amount may be decreased by a greater amount such as by 2, for example. Such differentiated decrements may facilitate reducing the number of candidate tracks for demotion. It is appreciated that other values may be selected for decrementing the prestage amount p as a function of different drive speeds, depending upon the particular application.

If it is determined (block 556) that the track being read is at the last track of a stage group, the prestage amount p may be increased (block 558) as a function of different speeds of different drives. For example, if the track was read from the hard drive storage 312 which is slower than the solid state drive 314, the prestage amount may be increased by 1, for example. If the track was read from a faster drive such as solid state storage 314, the prestage amount may be increased by a larger amount such as by 2, for example. Such differentiated increments may facilitate prestaging sufficient data to reduce cache misses. It is appreciated that other values may be selected for incrementing the prestage amount p as a function of different drive speeds, depending upon the particular application.

By increasing the prestage amount p, it is intended to decrease the chances of running out of prestaged data and causing a cache miss. However, if it is previously determined (block 560) that the prestage amount p has reached a maximum, such as a maximum of 84, for example, the prestage amount p is not increased. It is appreciated that other values may be selected for a maximum, depending upon the particular application.

In the illustrated embodiment, another determination is made as to whether the size of the prestage trigger has reached or exceeded (block 590) the prestage amount p. If so, additional tracks may prestaged (block 595). It is believed that issuing additional prestages will permit the prestage trigger g to continue to grow to facilitate avoiding a cache miss due to prestage triggers of insufficient size. It is appreciated that other values may be selected for determining when to prestage additional tracks as a function of prestage trigger size, depending upon the particular application.

It is seen that cache prestaging operations in accordance with one aspect of the present description may take into account storage devices of varying speeds and bandwidths for purposes of modifying one or both of a prestage trigger and the prestage amount. Such a capability may be particularly suitable for storage controllers having a mix of solid state storage and hard drive storage, for example.

Still further, a cache prestaging operation in accordance with another aspect of the present description may decrease one or both of the prestage trigger and the prestage amount in circumstances such as a cache miss which may have resulted from prestaged tracks being demoted before they are used. Conversely, a cache prestaging operation in accordance with another aspect of the present description may increase one or both of the prestage trigger and the prestage amount in circumstances such as a cache miss which may have resulted from waiting for a stage to complete.

In yet another aspect, the prestage trigger may not be limited by the prestage amount p. Instead, the pre-stage trigger may be permitted to expand as conditions warrant it by prestaging additional tracks and thereby effectively increasing the potential range for the prestage trigger.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, interconnected storage devices, an array of storage devices, multiple memory or storage devices or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 2 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the system of FIG. 2 may provide clients, and other servers and software and/or hardware components in the networked cloud, with scheduling services.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4 and 5 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In some embodiments, a solid state storage 314 was described as having a substantially faster drive speed or access time as compared to that of a hard drive storage 312. However, it is appreciated that features of the present description are also applicable or beneficial to additional embodiments in which the drive speeds of various drives of the system may be the same, as well, depending upon the particular application.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
reading units of data of a sequential stream of read data stored in at least one of a first storage drive having a drive speed and a second storage drive having a second drive speed different from that of the first drive speed;
setting a prestage trigger to initiate prestaging of units of read data;
in response to reaching the trigger as the units of the sequential stream of read data are read, prestaging an amount of units of data of the sequential stream of read data from a storage drive into a cache memory in anticipation of a read request; and
modifying at least one of the value of the prestage trigger and the value of the prestage amount, as a function of the drive speed of the storage drive from which the units of read data are prestaged into the cache memory, being different from the other storage drive.

2. The method of claim 1, further comprising:
staging units of data of the sequential stream of read data into the cache memory;
demoting a unit of data from the cache before the unit being demoted is read from cache in response to a read request; and
determining if a cache miss occurs in connection with a unit of data that had been demoted from the cache;
wherein modifying at least one of the value of the prestage trigger and the value of the prestage amount includes reducing both the value of the prestage trigger and the value of the prestage amount, in response to a determination that a cache miss occurs in connection with a unit of read data that had been demoted from the cache, and as a function of the drive speed of the storage drive from which the units of read data are prestaged into the cache memory, wherein the reducing at least one of the value of the prestage trigger and the value of the prestage amount, in association with the demoting of a unit of data from the cache includes determining if a cache miss occurred and determining if a stage was in progress at the time of the cache miss.

3. The method of claim 1, further comprising:
comparing the modified value of the prestage trigger to the amount of data to be prestaged in response to the trigger; and
prestaging units of data of the sequential stream of read data into the cache memory as a function of the comparison,
in response to reaching the modified value trigger as the units of the sequential stream of read data are read, prestaging units of data after staged units of read data of the sequential stream of read data from a storage drive into the cache memory in anticipation of a read request.

4. The method of claim 1 further comprising:
staging units of data of the sequential stream of read data into the cache memory; and
determining if a cache miss occurred because a staging has not completed;
wherein said modifying at least one of the value of the prestage trigger and the value of the prestage amount, includes increasing the value of the prestage trigger as a function of the drive speed of the storage drive from which the units of read data are prestaged into the cache memory, if it is determined that a cache miss occurred because a staging has not completed; and wherein the first storage drive is a hard disk drive and the second storage drive is a flash memory drive having a drive speed faster than that of the hard disk drive, and wherein said increasing the value of the prestage trigger includes increasing the value of the prestage trigger by a first value if the read data being prestaged is from the hard disk drive, and increasing the value of the prestage trigger by a second value higher than the first value, if the read data being prestaged is from the flash drive.

5. The method of claim 1 further comprising:

monitoring unused units of read data in the cache memory;

determining whether unused units of read data in the cache are candidates for demotion from the cache as a function of time spent in the cache relative to other unused units of read data in the cache;

determining if a cache hit occurs in connection with a unit of read data which was a candidate for demotion from the cache;

wherein said modifying at least one of the value of the prestage trigger and the value of the prestage amount includes decreasing the value of the prestage amount as a function of the drive speed of the storage drive from which the units of read data are prestaged into the cache memory, in response to a determination that a cache hit occurs in connection with a unit of read data which was a candidate for demotion from the cache; and wherein the first storage drive is a hard disk drive and the second storage drive is a flash memory drive having a drive speed faster than that of the hard disk drive, and wherein said decreasing the value of the prestage trigger includes decreasing the value of the prestage trigger by a first value if the read data being prestaged is from the hard disk drive and decreasing the value of the prestage trigger by a second value higher than the first value, if the read data being prestaged is from the flash drive.

6. The method of claim 1, further comprising:

staging units of data of the sequential stream of read data into the cache memory; and determining if a read track is the last track of a stage group;

wherein modifying at least one of the value of the prestage trigger and the value of the prestage amount includes increasing the value of the prestage amount as a function of the drive speed of the storage drive from which the units of read data are prestaged into the cache memory.

\* \* \* \* \*